O. SUTTER.
BEAN SORTER.
APPLICATION FILED OCT. 29, 1908.

920,499.

Patented May 4, 1909.
2 SHEETS—SHEET 1.

Witnesses.
A. H. Opsahl.
R. P. Hicks.

Inventor.
Ole Sutter.
By his Attorneys
Williamson Merchant

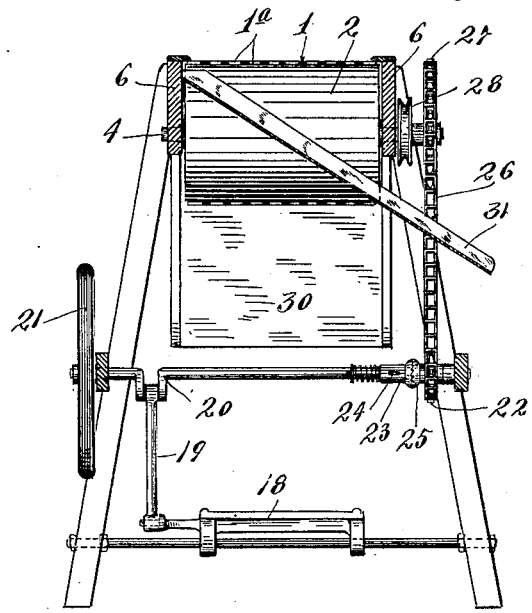
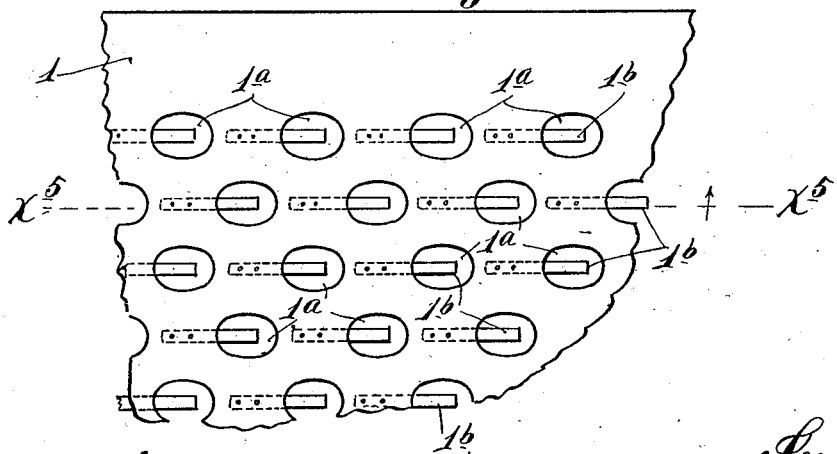

UNITED STATES PATENT OFFICE.

OLE SUTTER, OF ISANTI, MINNESOTA.

BEAN-SORTER.

No. 920,499.     Specification of Letters Patent.     Patented May 4, 1909.

Application filed October 29, 1908. Serial No. 460,031.

*To all whom it may concern:*

Be it known that I, OLE SUTTER, citizen of the United States, residing at Isanti, in the county of Isanti and State of Minnesota, have invented certain new and useful Improvements in Bean-Sorters; and I do hereby declare the following to be a full, clear, and exact description of the invention, such as will enable others skilled in the art to which it appertains to make and use the same.

My invention has for its object to provide an improved machine especially adapted for use in sorting beans, peas and coffee, and to this end, it consists of the novel devices and combinations of devices hereinafter described and defined in the claims.

Hitherto it has been customary in sorting beans and certain other materials, to employ an endless traveling belt or apron as a carrier therefor, and to pick up and remove by hand all discolored or imperfect beans. This has been found to be a slow process because of the considerable difficulty of picking up or removing the discolored or imperfect beans from the belt containing the thinly spread out body of commingled perfect and imperfect stock.

My invention very greatly facilitates the removal of the discolored or imperfect beans or other kernels of material being sorted, by the provision of a traveling carrier, preferably in the form of an endless belt or apron having pockets with yielding bottoms. With this improved belt or carrier, the beans or the kernels of the material being sorted, will be lodged in the multiplicity of pockets, and discolored or imperfect beans may be very easily and quickly discharged from the said belt or carrier, simply by forcing the same downward through the bottoms of the said pockets.

In the accompanying drawings which illustrate the invention, like characters indicate like parts throughout the several views.

Figure 2:
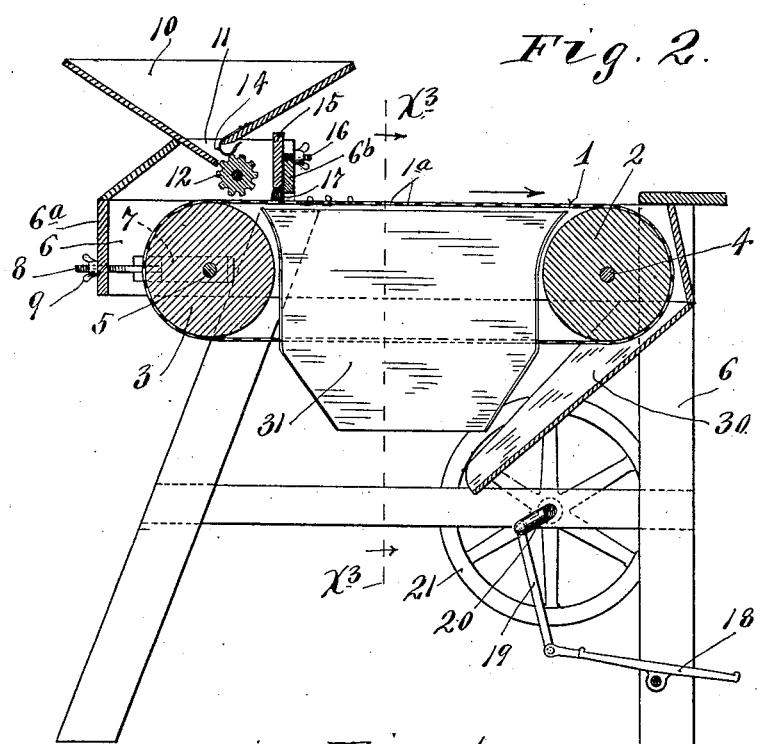
Figure 1:
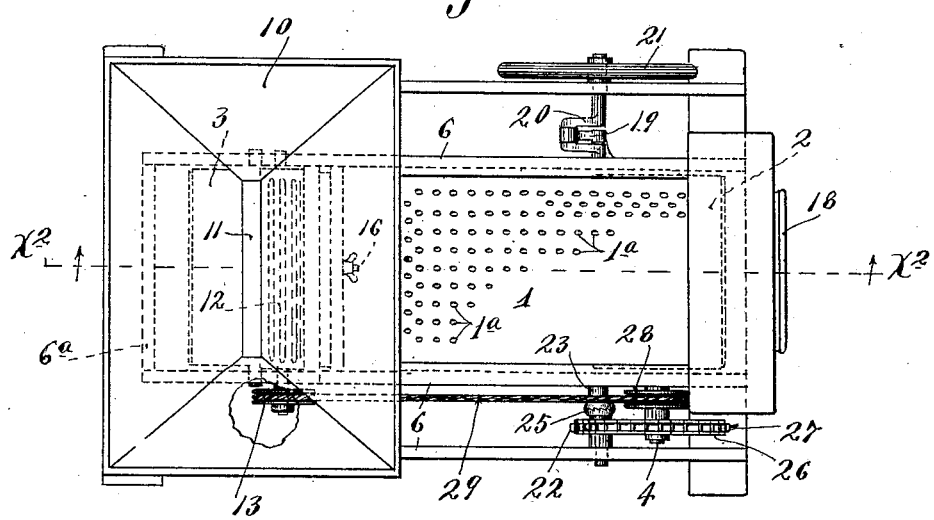

Referring to the drawings: Figure 1 is a plan view of the improved machine; Fig. 2 is a vertical section taken on the line $x^2$ $x^2$ of Fig. 1; Fig. 3 is a transverse vertical section taken through the machine on the line $x^3$ $x^3$ of Fig. 2; Fig. 4 is an enlarged detail in plan, showing a portion of the pocketed endless belt; and Fig. 5 is a section taken on the line $x^5$ $x^5$ of Fig. 4.

The endless belt or apron which is arranged to run over large rollers 2 and 3, is journaled in suitable bearings on the sides of a frame work 6, and the shaft 5 is journaled in bearings 7, that are mounted to slide in suitable seats formed in the upper side portions of the frame 6. Said bearings 7 are provided with threaded stems 8 that project through perforations in a transverse portion $6^a$ of the frame 6, and are provided with nuts 9 that work against the said frame portions $6^a$ and serve, when tightened, to move the roller 3 away from the roller 2, and thereby tighten the belt 1.

The belt 1 is provided with a multiplicity of pockets $1^a$ having yielding bottoms, which, as shown, are afforded by light flat springs $1^b$. The pockets $1^a$ should be of such size that each will receive but one bean or one kernal of the material that is to be sorted. The bottom formed springs $1^b$, at one end, are attached to the belt 1, and their free ends underlie corresponding pockets $1^a$ and preferably project a little more than one-half way across the longitudinal axis of the said pockets.

A supply hopper 10 is secured to the frame 6 above the roller 3, and is provided in its bottom with a discharge passage 11 that opens directly onto a corrugated feed roller 12, the shaft of which projects through the upwardly extended side portions of the frame 6, and is provided with a sheave 13, shown in Fig. 1. To prevent too rapid feed of the beans from the hopper under rotation of the roller 12, a curved yielding blade 14 is shown as attached to the bottom of the hopper and engaged with the top of said roller. In front of the roller 12, and above the upper portion of the belt 1, the frame 6 is provided with a transverse bar $6^b$, to which another bar 15 is connected with freedom for vertical adjustments, by means of nutted bolts 16. At its lower edge, the bar 15 is provided with a brush body 17, which when properly adjusted, lightly engages the entire upper surface of the belt 1, and serves to hold back beans which have not been deposited in the pockets $1^a$.

The belt 1 and the feed roller 12 may be driven in a good many different ways, but as shown, they are arranged to receive motion from a foot treadle 18, pivotally connected to the lower front portion of the frame 6, and connected by a link 19 to a crank shaft 20 suitably mounted in bearings afforded by the frame 6. At one end, the crank shaft 20 is shown as provided with a fly wheel 21, and near its other end, it is provided with a sprocket 22 and a spring pressed sleeve 23. The sprocket 22 is primarily free for rotation on said crank shaft, while the sleeve 23 is held to rotate with said shaft, as shown, by means of a slot and pin connection 24. The sprocket 22 and the sleeve 23 are provided with normally engaging clutch members 25. A sprocket chain 26 runs over the sprocket 22 and over a larger sprocket 27 secured on one end of the shaft 4 of the roller 2. Adjacent to said sprocket 27, the said shaft 4 is provided with a sheave 28, over which, and the sheave 13 on the shaft of the feed roller 12, a belt 29 is arranged to run so as to thereby impart rotary movement to the said feed roller.

The clutch members 25 are so arranged that they will drive the sprocket 22, when the crank shaft is rotated in the proper direction, to drive the belt 1 in the direction indicated by the arrow marked adjacent thereto on Fig. 2, but they will slip the one upon the other when the said crank shaft is rotated in a reverse direction, to-wit, in a direction which will tend to impart a backward travel to the said belt 1.

When the sheave is used for sorting beans, for instance, the good or perfect beans will be carried by the belt 1 and dropped onto the inclined spout 30, from which they may be caught by any suitable receptacle. The imperfect beans, which are pushed through the pockets of the belt 1, will drop onto the transversely inclined spout 31 and will be delivered at one side of the machine, and may, of course, be caught by any suitable receptacle. To force the beans through the bottoms of the pockets of the belt 1, as above stated, a finger may be used, or a small stick or pencil, or other suitable devices may be employed. In practice, it has been found that beans may be very rapidly sorted by the use of this improved machine.

The machine will also be found highly efficient for use in sorting peas and in sorting unground coffee kernels. In practice, it may be found efficient for the sorting of a great many other different kinds of materials.

What I claim is:

1. In a machine of the kind described, a traveling belt or apron provided with pockets having yielding bottoms, the said pockets formed by perforations in the said belt or apron, the said yielding bottoms being afforded by springs attached at one end to said belt or apron, with their free ends underlying said perforations.

2. A flexible non-metallic belt or apron provided with pockets formed by perforations in the body thereof, in combination with yieldingly held metallic fingers each secured to said belt adjacent to one of said pockets and each normally underlying and constituting a yielding bottom to a coöperating pocket.

In testimony whereof I affix my signature in presence of two witnesses.

OLE SUTTER.

Witnesses:
   F. D. MERCHANT,
   H. D. KILGORE.